United States Patent
Grass et al.

(10) Patent No.: US 7,044,105 B2
(45) Date of Patent: May 16, 2006

(54) METHODS AND DEVICE FOR CONTROLLING AN INTERNAL COMBUSTION ENGINE

(75) Inventors: Gerd Grass, Schwieberdingen (DE); Ruediger Weiss, Moetzingen (DE); Markus Amler, Leonberg-Gebersheim (DE); Hansjoerg Bochum, Novi, MI (US)

(73) Assignee: Robert Bosch GmbH, Stuttgart (DE)

(*) Notice: Subject to any disclaimer, the term of this patent is extended or adjusted under 35 U.S.C. 154(b) by 156 days.

(21) Appl. No.: 10/433,985

(22) PCT Filed: Dec. 11, 2001

(86) PCT No.: PCT/DE01/04659

§ 371 (c)(1),
(2), (4) Date: Aug. 27, 2003

(87) PCT Pub. No.: WO02/052139

PCT Pub. Date: Jul. 4, 2002

(65) Prior Publication Data

US 2004/0069268 A1    Apr. 15, 2004

(30) Foreign Application Priority Data

Dec. 22, 2000 (DE) .................. 100 64 653

(51) Int. Cl.
*F02B 5/00* (2006.01)

(52) U.S. Cl. .................. 123/305; 123/395; 123/435

(58) Field of Classification Search ........ 123/299, 123/305, 395, 435, 445, 472, 480
See application file for complete search history.

(56) References Cited

U.S. PATENT DOCUMENTS

| 4,747,386 A | * | 5/1988 | Onishi .................. 123/491 |
| 4,951,633 A | | 8/1990 | Achleitner et al. |
| 5,044,339 A | * | 9/1991 | Udo Hafner .............. 123/456 |
| 6,718,948 B1 | * | 4/2004 | Vahle et al. ............. 123/458 |

FOREIGN PATENT DOCUMENTS

| DE | 40 39 598 | | 6/1992 |
| DE | 44 35 419 | | 4/1996 |
| DE | 195 47 644 | | 6/1997 |
| GB | GB 2252640 | * | 8/1992 |
| JP | 08 177590 | | 11/1996 |

OTHER PUBLICATIONS

DE 19547644 translated abstract.*

(Continued)

*Primary Examiner*—Bibhu Mohanty
(74) *Attorney, Agent, or Firm*—Walter Ottesen

(57) ABSTRACT

A first method is for determining a variable, which characterizes a fuel injection, in an internal combustion engine of a motor vehicle in a hot-start situation wherein fuel is injected directly into at least one combustion chamber from a high-pressure region of a fuel supply system; the variable, which characterizes the injection quantity, is corrected at least in dependence upon a variable which represents a temperature of the fuel. A second method is for determining a hot-start situation in an internal combustion engine of a motor vehicle wherein a hot-start situation is determined at least based on a variable, which represents a temperature of the fuel, and based on a fuel pressure. The invention relates likewise to corresponding arrangements, a corresponding control apparatus for an internal combustion engine, a corresponding computer program having program-code means and a corresponding computer program product having program-code means.

8 Claims, 2 Drawing Sheets

OTHER PUBLICATIONS

JP 08177590 translated abstract.*
DE 443419 translated abstract.*
DE 19547644 translated abstract.*

* cited by examiner

METHODS AND DEVICE FOR CONTROLLING AN INTERNAL COMBUSTION ENGINE

RELATED APPLICATIONS

This application is the national stage of international application PCT/DE 01/04659, filed Dec. 11, 2001, designating the United States and claiming priority from German patent application No. 100 64 653.0, filed Dec. 22, 2000, the entire content of which is incorporated herein by reference.

FIELD OF THE INVENTION

The invention relates to a method for determining a variable, which characterizes an injection quantity, in an internal combustion engine of a motor vehicle in a hot-start situation. The invention also relates to a method for determining a hot-start situation in an internal combustion engine of a motor vehicle. The invention likewise relates to the following: corresponding arrangements, a corresponding control apparatus for an internal combustion engine, a corresponding computer program having computer-code means and a corresponding computer program product having program-code means.

BACKGROUND OF THE INVENTION

Generally, a hot-start situation is meant when, for example, after a short operating pause, a renewed start takes place in an internal combustion engine which is still hot. In a hot engine at rest, fuel vapor bubbles form in the fuel line as well as in the injection valve itself. In the next start operation, these fuel vapor bubbles then hinder the regular metering of fuel.

For this reason, an extended injection signal is, for example, outputted under hot-start conditions so that a certain minimum quantity of fuel can be made available for the injection process even when there is an occurrence of the fuel vapor bubbles.

German patent publication 4,039,598 discloses a hot-start method and a hot-start arrangement for an internal combustion engine. A hot-start situation is then assumed in accordance with the teaching presented there when the engine temperature as well as the intake air temperature exceed specific threshold values and, furthermore, the difference in magnitude between the intake-air temperature at an earlier time point and the intake-air temperature at a new start lies above a selectable threshold.

German patent publication 4,435,419 discloses a control system for metering fuel to an internal combustion engine. Here, a hot-start situation is assumed and a corresponding hot-start bit is set when the engine temperature exceeds a first threshold value and, in addition, an increase of the intake air temperature by a specific amount has taken place since the last measurement. The last value can be that value which was present at the time point of switching off the engine and the new value can be obtained at the time point of switching on the ignition or the starter. The hot-start bit remains set until the engine temperature has dropped below a second threshold value or until a predetermined total air mass has flown through the intake manifold. The last-mentioned total air mass is determined by means of an integration of the signal of an air-mass sensor in the intake manifold.

A method and an arrangement for controlling the metering of fuel in an internal combustion engine are known from German patent publication 195 47 644. Here, the fuel quantity, which is to be injected, is corrected in dependence upon the temperature, the density and the pressure of the fuel. The method of German patent publication 195 47 644 is preferably utilized in self-igniting internal combustion engines which are equipped with a common rail system.

Especially in modern fuel injection systems (which systems operate with a high-pressure fuel injection), some components become hot such as the high-pressure pump even after switching off the engine whereby increased temperature values can occur compared to the switch-off temperature. For a subsequent hot-start situation, the correct metering of fuel is of special significance so that a certain and reliable start is ensured. An essential aspect is also the hot-start recognition itself.

SUMMARY OF THE INVENTION

The invention is based on the task to improve the determination of a variable, which characterizes an injection quantity, in an internal combustion engine of a motor vehicle in a hot-start situation as well as to improve the determination of a hot-start situation in an internal combustion engine of a motor vehicle.

The task is solved, on the one hand, by a method for determining a variable, which characterizes an injection quantity, in an internal combustion engine of a motor vehicle in a hot-start situation. Fuel from a high-pressure region of the fuel supply system is injected directly into at least one combustion chamber. The variable, which characterizes the injection quantity, is corrected in the hot-start situation. The variable, which characterizes the injection quantity, is corrected at least in dependence upon a variable representing a temperature of the fuel.

In this way, in fuel supply systems having high-pressure injection, the temperature of the fuel when metering the fuel is considered in an advantageous manner which leads to an improved start performance and combustion performance in the hot-start situations.

Embodiments of the invention provide that the variable, which characterizes the injection quantity, is an injection duration and that the variable, which represents the temperature of the fuel, is an engine temperature or a coolant temperature and that a hot-start situation is determined based on the variable, which represents the temperature of the fuel, and a fuel pressure.

With these embodiments of the invention, the temperature and the pressure of the fuel are considered in an advantageous manner in the metering of fuel so that it is ensured in a hot start that the determined fuel quantity is metered. This leads to an especially cultivated start performance of the engine with simultaneously reduced exhaust-gas emissions. It is especially advantageous to determine the fuel pressure in the high-pressure range of the fuel supply system whereby the pressure, which acts directly on the fuel to be injected, is considered in the metering of the fuel.

A preferred embodiment of the method provides that a hot-start situation is detected when an engine temperature or a coolant temperature exceeds an applicable temperature threshold value and the fuel pressure in the high-pressure range drops below an applicable pressure threshold value.

In this way, and especially for fuel supply systems having high-pressure injection, a hot-start situation is reliably detected and the fuel quantity can be correspondingly metered because of the correction of the injection duration.

The temperature of the fuel can be advantageously determined in correspondence to a model and/or an applicable characteristic field of the engine temperature or coolant temperature. Furthermore, a critical temperature can be determined based on the fuel pressure in the high-pressure region of the fuel supply system and/or be taken from an applicable characteristic field. By means of the determined fuel temperature and the critical temperature, a hot-start situation can be especially advantageously detected in that the temperature of the fuel exceeds the critical temperature.

The task is further solved with a method for determining a hot-start situation in an internal combustion engine of a motor vehicle wherein a hot-start situation is determined at least based on a variable, which represents a temperature of the fuel, and based on a fuel pressure. With this measure, a hot-start situation in motor vehicles can be determined especially easily, rapidly and reliably.

The task is further solved with an arrangement for determining a variable, which characterizes an injection quantity, in an internal combustion engine of a motor vehicle in a hot-start situation. Fuel from a high-pressure region of the fuel supply system is injected directly into at least one combustion chamber. The variable, which characterizes the injection quantity, is corrected in the hot-start situation. Means are provided with which the variable, which characterizes the injection quantity, can be corrected at least in dependence upon a variable which represents a temperature of the fuel.

The task is further solved with an arrangement for determining a hot-start situation in an internal combustion engine of a motor vehicle. Means are provided with which a hot-start situation can be determined based on a variable, which represents a temperature of the fuel, and based on a fuel pressure.

Of special significance is the realization of the method of the invention in the form of a control apparatus for an internal combustion engine, especially, of a motor vehicle. Here, means are provided for carrying out the steps of the above-described methods.

Of special significance are further the realizations in the form of a computer program having program-code means and in the form of a computer program product having program-code means. The computer program according to the invention includes program-code means in order to carry out all steps of the method of the invention when the program is carried out on a computer, especially on a control apparatus for an internal combustion engine of a motor vehicle. In this case, the invention is realized by a program stored in the control apparatus so that this control apparatus, which is provided with the program, defines the invention in the same way as the method. The computer program product of the invention includes program-code means which are stored on a computer-readable data carrier in order to carry out the method of the invention when the program product is executed on a computer, especially, on a control apparatus for an internal combustion engine of a motor vehicle. In this case, the invention is realized by a data carrier so that the methods of the invention can be carried out when the program product or the data carrier is integrated into a control apparatus for an internal combustion engine, especially, of a motor vehicle. As a data carrier or as a computer program product, an electric storage medium can especially be applied, for example, a read-only-memory (ROM), an EPROM or also an electric permanent memory such as a CD-ROM or DVD.

Further features, application possibilities and advantages of the invention will become apparent from the following description of the embodiments of the invention which are shown in the following figures. All described embodiments or illustrated features themselves or in any desired combination define the subject matter of the invention independently of their formulation or their illustration in the drawing.

DESCRIPTION OF THE PREFERRED EMBODIMENTS OF THE INVENTION

Figure 1:
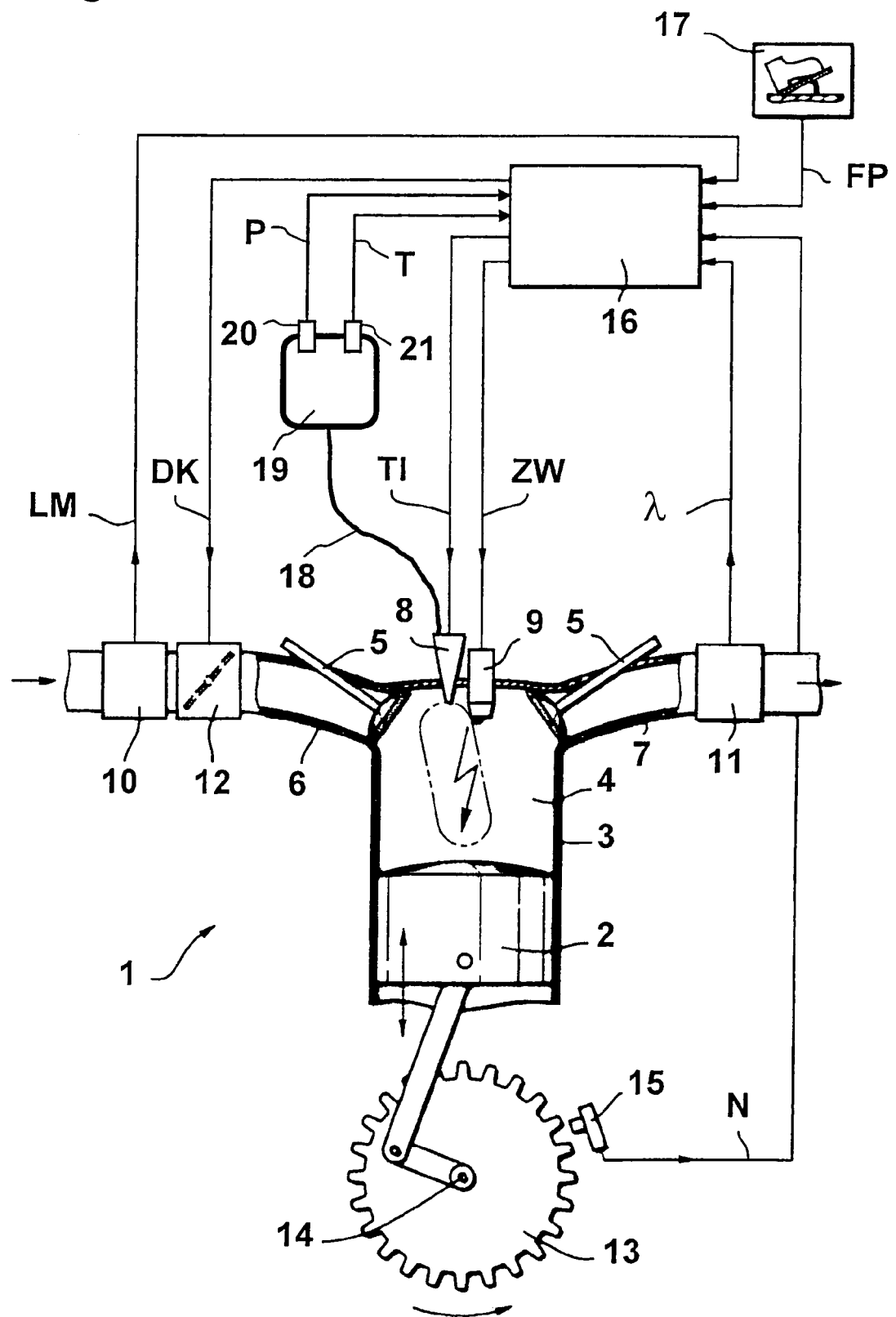
FIG. 1 shows an arrangement of the invention; and,
FIG. 2 shows a method of the invention.

In FIG. 1, an internal combustion engine 1 is shown wherein a piston 2 is movable back and forth in a cylinder 3. The cylinder 3 is provided with a combustion chamber 4 to which an intake manifold 6 and an exhaust-gas pipe 7 are connected via valves 5. Furthermore, an injection valve 8 and a spark plug 9 are connected to the combustion chamber 4. The injection valve 8 is driveable by a signal TI and the spark plug 9 is driveable by a signal ZW. The signals TI and ZW are transmitted by a control apparatus 16 to the injection valve 8 and the spark plug 9, respectively. The signal TI defines the injection signal and the signal ZW the ignition angle. The injection valve is supplied with fuel by a fuel high-pressure store 19 (for example, a common rail) via a high-pressure line 18. A pressure sensor 20 and a temperature sensor 21 are mounted in the fuel high-pressure store 19 and transmit a pressure signal P and a temperature signal T to the control apparatus 16. A high-pressure pump moves the fuel from a low-pressure region into the high-pressure region of the fuel high-pressure store 19 and is not shown in the illustration of FIG. 1.

The intake manifold 6 is provided with an air-mass sensor 10 and the exhaust-gas pipe 7 is provided with a lambda sensor 11. The air-mass sensor 10 measures the air mass of the fresh air supplied to the intake manifold 6 and generates a signal LM in dependence thereon. The lambda sensor 11 measures the oxygen content of the exhaust gas in the exhaust-gas pipe 7 and generates a signal lambda in dependence thereon. The signals of the air-mass sensor 10 and the lambda sensor 11 are supplied to the control apparatus 16.

A throttle flap 12 is accommodated in the intake manifold 6 and its rotational position is adjustable by means of a signal DK. Furthermore, the exhaust-gas pipe 7 can be connected to the intake manifold 6 via an exhaust-gas recirculation line (not shown). The control of the exhaust-gas recirculation can, for example, take place via an exhaust-gas recirculation valve which is likewise not shown and can be driven by the control apparatus 16.

In a first mode of operation, the homogeneous operation of the engine 1, the throttle flap 12 is partially opened or closed in dependence upon the desired supplied air mass. The fuel is injected by the injection valve 8 into the combustion chamber 4 during an induction phase caused by the piston 2. The injected fuel is swirled by the simultaneously inducted air and is distributed essentially uniformly/homogeneously in the combustion chamber 4. Thereafter, the air/fuel mixture is compressed during the compression phase in order to then be ignited by the spark plug 9. The piston 2 is driven by the expansion of the ignited fuel.

In a second mode of operation, the stratified mode of operation of the engine 1, the throttle flap 12 is opened wide. The fuel is injected into the combustion chamber 4 during a compression phase caused by the piston 2. Then, with the aid of the spark plug 9, the fuel is ignited so that the piston 2 is driven in the following work phase by the expansion of the ignited fuel.

In stratified operation as in homogeneous operation, a rotational movement is imparted to a crankshaft 14 by the driven piston via which finally the wheels of the motor vehicle are driven. A toothed wheel is mounted on the crankshaft 14 whose teeth are scanned by an rpm sensor 15 mounted directly opposite the toothed wheel. The rpm sensor 15 generates a signal from which the rpm (n) of the crankshaft 14 is determined and transmits this signal (n) to the control apparatus 16.

The fuel mass, which is injected into the combustion chamber in stratified operation and in homogeneous operation, is controlled (open loop and/or closed loop) by the control apparatus 16 especially in view to a reduced fuel consumption and/or to a reduced development of toxic substances. The determination according to the invention of a hot-start situation as well as the determination of the injection duration in a hot-start situation take also place in the control apparatus 16. For this purpose, the control apparatus 16 is provided with a microprocessor which has a program code stored in a memory medium which is suitable to execute the total control (open loop and/or closed loop) of the engine 1.

Input signals are applied to the control apparatus 16 and define operating variables of the engine measured by means of sensors. For example, the control apparatus 16 is connected to the following: the air-mass sensor 10, the lambda sensor 11, the rpm sensor 15, the pressure sensor 20 and the temperature sensor 21. Furthermore, the control apparatus 16 is connected to an accelerator pedal sensor 17 which generates a signal FP which indicates the position of an accelerator pedal, which is actuable by a driver, and therefore indicates the torque requested by the driver. An engine temperature signal is supplied as an additional input signal (not shown in FIG. 1) to the control apparatus 16. This input signal can, for example, be the signal of a cooling water temperature sensor, an oil temperature sensor or even a component temperature sensor mounted on the engine block. The control apparatus 16 generates output signals with which, via actuators, the performance of the engine 1 can be influenced in correspondence to the desired control (open loop and/or closed loop). For example, the control apparatus 16 is connected to the injection valve 8, the spark plug 9 and the throttle flap 12 and generates the signals TI, ZW and DK required for the control of the injection valve, spark plug and throttle flap.

The method according to the invention is implemented by the control apparatus 16 and is explained in greater detail hereinafter.

Basically, a vapor bubble formation in the fuel supply system occurs with conventional fuels starting with temperatures above 100° C. and at system pressures of approximately 3 to 4 bar. In modern engines (which are provided with a high-pressure fuel injection, for example, a gasoline direct injection), no high pressure is available in the fuel supply system as a rule at the start of the engine. Because of the non-presence of the high pressure in start situations, it can sometimes happen that a hot-start situation is present because of the overheating of the fuel caused by the components of the fuel supply system which are still hot. As a rule, after switching off the engine, it can occur that the temperature of the fuel (which is disposed in the injection system and in the fuel supply system, especially in the common rail) can increase in temperature for approximately 10 minutes longer until the temperature of the fuel starts to drop. Because of this temperature increase after switching off the motor vehicle, a vapor bubble formation can occur in the fuel system after switching off the vehicle which leads, in a new-start situation, to a hot start.

Figure 2:
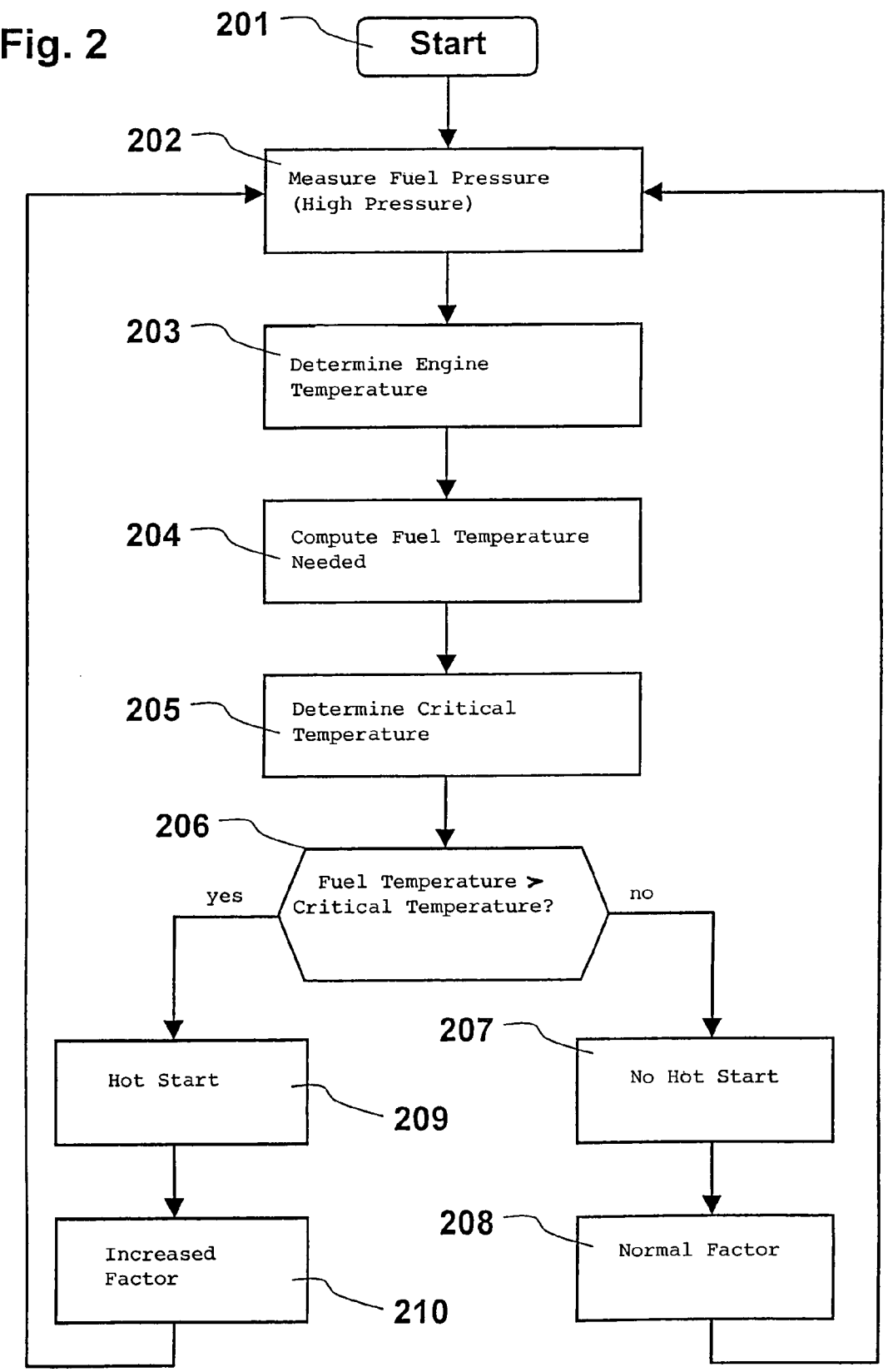

FIG. 2 shows an embodiment of the method of the invention. The method of the invention starts with step 201. In this step, for example, the initializations, which are required in the control apparatus, can take place for carrying out the method of the invention. In a next step 202, the fuel pressure in the fuel high-pressure store 19 is measured. This can take place, for example, with a pressure sensor 20. In step 203, which follows step 202, the temperature of the engine is determined. For this purpose, the temperature of a fluid in the engine is, as a rule, measured. Preferably, the coolant temperature of the engine is applied as the engine temperature. Alternatively, it is, however, also possible to use a special component temperature sensor which is mounted in the region of the cylinder head. In the ideal case, which, however, does not occur in practice because of cost reasons, the fuel temperature can be measured directly in the high-pressure store 19 with a corresponding temperature sensor 21.

After the completed engine temperature determination in step 203, the fuel temperature is computed in step 204 based on a model. In the simplest case, it can be assumed in this model that the fuel temperature differs by a constant offset from the engine temperature, for example, 5°. Here, the fuel temperature would correspond to the engine temperature less an offset value. As an alternative, the determination of the fuel temperature can be made based on a characteristic field stored in the control apparatus. Such a characteristic field can contain additional parameters in addition to the engine temperature, such as the shut-off duration of the motor vehicle, the ambient temperature of the motor vehicle, specific data of the used coolant or also data specific to the fuel.

In step 205 which follows step 204, a critical temperature is determined in correspondence to the measured fuel pressure and the previously determined fuel temperature. Here, the critical temperature is formed primarily in dependence upon the fuel pressure. Here also, the possibilities result that the critical temperature can be determined in correspondence to a predetermined computation rule or based on a characteristic field stored in the memory of the control apparatus.

In the next step 206, a check is made as to whether the determined fuel temperature lies above the previously determined critical temperature threshold. If this is not the case, then the program moves from step 206 to step 207 wherein the decision is made that no hot-start situation is present. A hot-start bit, which is possibly provided in the control apparatus, is not set in this case. In the next determination of the injection duration, the normal injection time computation, which anyway runs in the control apparatus is used. Accordingly, no increase of the determined injection time by a so-called hot-start factor takes place. Thereafter, the method returns to step 202.

If, in contrast, it was determined in step 206 that the determined fuel temperature lies above the determined critical temperature then there is a movement over to step 209 wherein a decision is made as to a hot-start situation. In step 209, a hot-start bit, which is present, for example, in the control apparatus, can be correspondingly set.

If a decision was made as to a hot-start in step 209, then the method continues with step 210. In step 210, an increase factor for the injection time, which is determined in the control apparatus, is determined under normal conditions in dependence upon to what extent the determined fuel temperature exceeded the critical temperature. In other words, in a hot-start situation, the injection duration is increased by a so-called hot-start factor. The hot-start factor is decisively dependent upon the determined fuel temperature and the determined critical temperature and therefore indirectly decisively on the engine temperature.

If the fuel temperature was the subject matter of discussion in the above explanations, then it is presumed that the fuel temperature in a high-pressure store, for example, a common rail of a fuel supply system is meant. The fuel temperature can either be determined directly via a temperature sensor 21 or via fuel temperature model 204.

What is claimed is:

1. A method for determining a first variable representing an injection quantity in an internal combustion engine of a motor vehicle having a fuel supply system, the method comprising the steps of:
    injecting fuel from a high-pressure region of said fuel supply system;
    determining a hot-start situation based on a second variable representing a temperature of said fuel and based on a pressure of said fuel; and,
    when said hot-start situation is detected, correcting said first variable in dependence upon said second variable.

2. The method of claim 1, wherein said first variable is an injection duration.

3. The method of claim 1, wherein said second variable is an engine temperature or a coolant temperature.

4. The method of claim 1, wherein the fuel pressure is determined in the high-pressure region of said fuel supply system.

5. A control apparatus for an internal combustion engine including an internal combustion engine of a motor vehicle having a fuel supply system, the control apparatus comprising means for carrying out a method for determining a first variable representing an injection quantity in said internal combustion engine, the method including the steps of:
    injecting fuel from a high-pressure region of said fuel supply system;
    determining a hot-start situation based on a second variable representing a temperature of said fuel and based on a pressure of said fuel; and,
    when said hot-start situation is detected, correcting said first variable in dependence upon said second variable.

6. A computer program comprising program-code means on a tangible medium for executing the steps of a method for determining a first variable representing an injection quantity in an internal combustion engine of a motor vehicle having a fuel supply system when said computer program is executed on a computer including a control apparatus for said engine, the method including the steps of:
    injecting fuel from a high-pressure region of said fuel supply system;
    determining a hot-start situation based on a second variable representing a temperature of said fuel and based on a pressure of said fuel; and,
    when said hot-start situation is detected, correcting said first variable in dependence upon said second variable.

7. A computer program product which comprises being stored on a computer-readable data carrier for executing the steps of a method for determining a first variable representing an injection quantity in an internal combustion engine of a motor vehicle having a fuel supply system when said computer program product is carried out on a computer including a control apparatus for said internal combustion engine, the method including the steps of:
    injecting fuel from a high-pressure region of said fuel supply system;
    determining a hot-start situation based on a second variable representing a temperature of said fuel and based on a pressure of said fuel; and,
    when said hot-start situation is detected, correcting said first variable in dependence upon said second variable.

8. An arrangement for determining a first variable representing an injection quantity in an internal combustion engine of a motor vehicle having a fuel supply system, the arrangement comprising:
    means for injecting fuel from a high-pressure region of said fuel supply system;
    means for determining a hot-start situation based on a second variable representing a temperature of said fuel and based on a pressure of said fuel; and,
    when said hot-start situation is detected, means for correcting said first variable in dependence upon said second variable.

* * * * *